United States Patent [19]

Frost

[11] Patent Number: 4,901,835
[45] Date of Patent: Feb. 20, 1990

[54] TRANSMISSION SYNCHRONIZER WITH SHIFT INHIBITOR

[75] Inventor: Barry L. Frost, DeWitt, N.Y.

[73] Assignee: Chrysler Motors Corporation, Highland Park, Mich.

[21] Appl. No.: 343,719

[22] Filed: Apr. 27, 1989

[51] Int. Cl.$^4$ .............................................. F16D 23/06
[52] U.S. Cl. ..................... 192/53 F; 74/339; 192/106 R; 192/114 R
[58] Field of Search ............... 192/53 F, 53 E, 53 G, 192/106 R, 53 R, 114 R, 67 A; 74/339

[56] References Cited

U.S. PATENT DOCUMENTS

| | | |
|---|---|---|
| 1,935,234 | 11/1933 | White . |
| 2,110,964 | 3/1938 | Ridgeway ............... 192/114 R X |
| 2,785,783 | 3/1957 | Homrig et al. . |
| 2,791,309 | 5/1957 | Couse ..................... 192/114 R |
| 2,931,474 | 4/1960 | Zittrell et al. . |
| 2,978,083 | 4/1961 | Henyon . |
| 3,032,159 | 5/1962 | Silks ......................... 192/106 R X |
| 4,059,178 | 11/1977 | Magg et al. . |
| 4,420,993 | 12/1983 | Woodcock . |
| 4,445,602 | 5/1984 | Chana . |
| 4,573,371 | 3/1986 | Akutagawa . |
| 4,684,000 | 8/1987 | Brown ....................... 192/114 R X |

Primary Examiner—Rodney H. Bonck
Attorney, Agent, or Firm—Edward P. Barthel

[57] ABSTRACT

A shift inhibitor for a manual transmission synchronizer clutch positioned on the main shaft and operative to prevent down-shifting to engage a selected speed gear with the output shaft being driven above a predetermined speed. The synchronizer hub has one or more pairs of diametrically opposed radially extending keyways with each keyway having a blocking key slidably disposed therein. A C-shaped wire spring partially surrounds the main shaft and has hook portions at each of its free ends retaining an associated pair of keys. The spring urges the pair of keys inwardly to a rest position wherein the synchronizer sleeve may be shifted to engage an associated speed gear of the transmission. Upon reaching a predetermined drive shaft rotational speed the pair of keys move outwardly under centrifugal force to a determined extended location whereby the extended keys contact shoulder stop faces of the sleeve internal splines preventing the sleeve from engaging the associated speed gear.

6 Claims, 5 Drawing Sheets

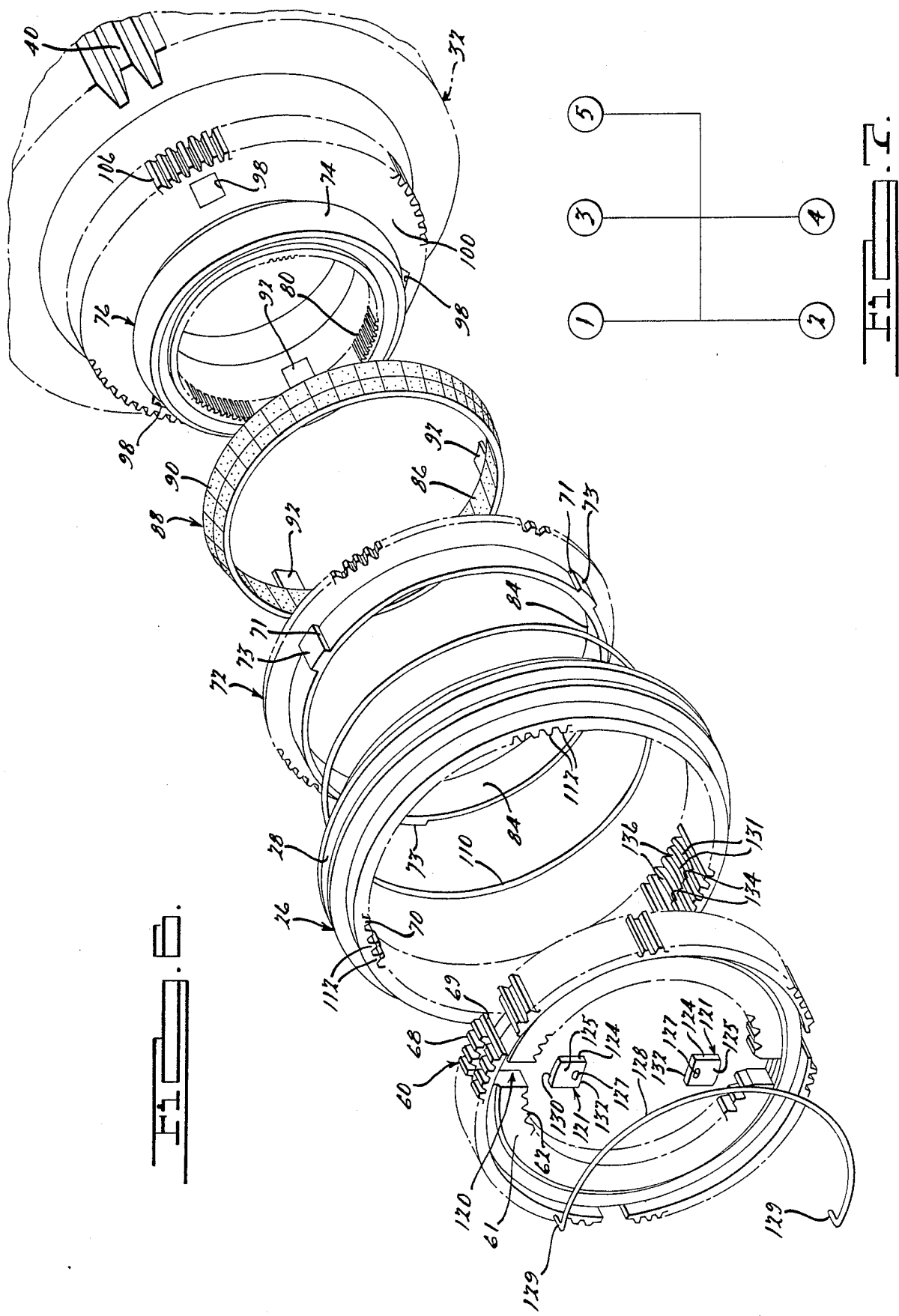

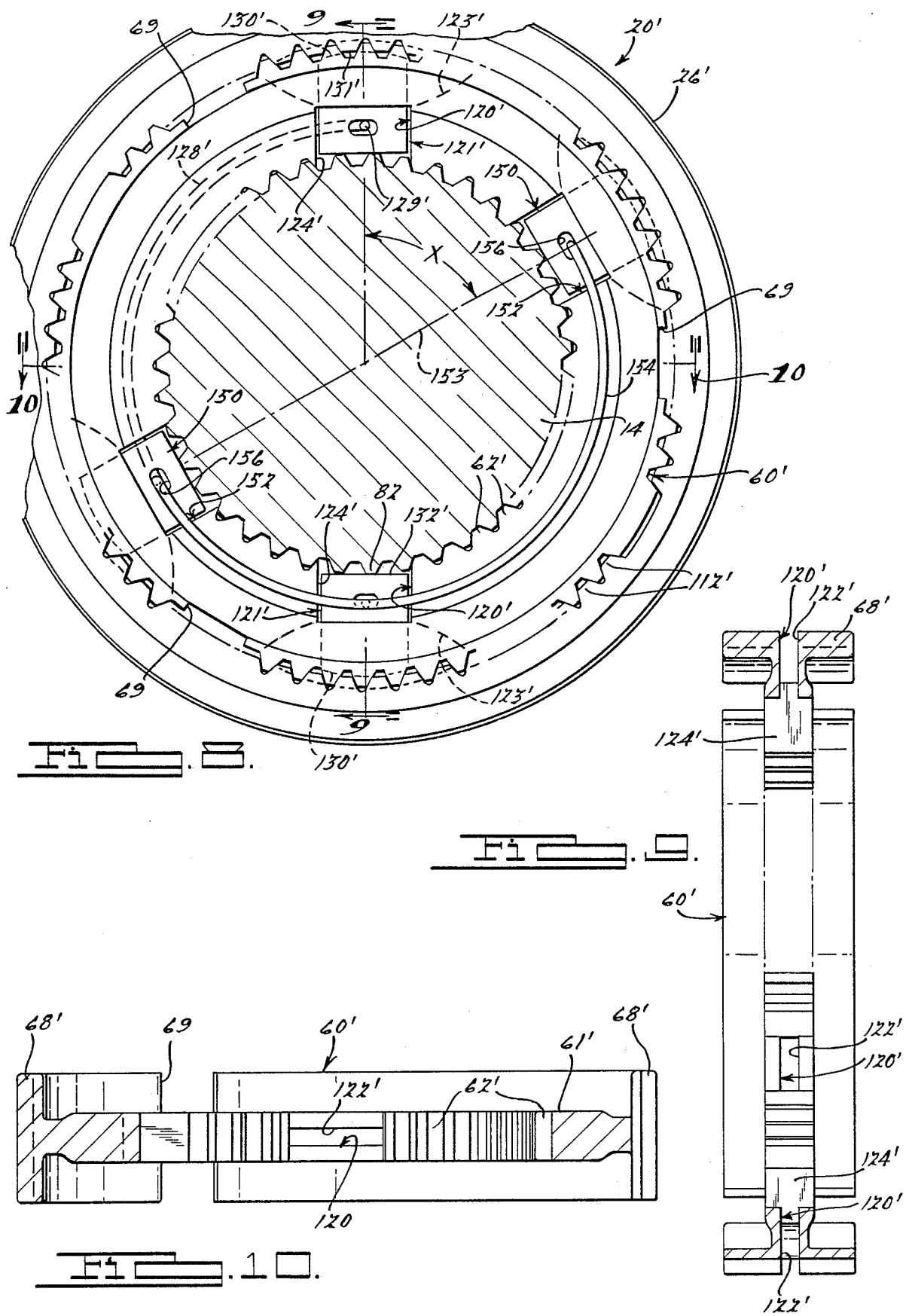

TRANSMISSION SYNCHRONIZER WITH SHIFT INHIBITOR

This invention relates to shift inhibitors for manual transmission synchronizers and more particularly to a centrifugal force induced shift inhibitor for a double-acting synchronizer obviating down-shifting above a predetermined drive shaft speed.

BACKGROUND OF THE INVENTION

It is known in the automotive clutch art to have relative movement between two members controlled by centrifugally developed liquid pressure acting to automatically engage or disengage the clutch. The U.S. Pat. No. 2,551,918 issued May 8, 1951 to Wickwire et al. discloses a centrifugal fluid operated clutch having three conditions of relative association. A first condition provides for clutch engagement under all circumstances, a second condition provides for clutch disengagement under all circumstances, and a third condition provides for automatic clutch engagement or disengagement depending upon the speed of the clutch driving member.

The U.S. Pat. No. 2,791,309 issued May 7, 1957 to Couse discloses a power take-off apparatus with clutch means for locking it in a driving position. A pair of locking members are provided in the form of pins slidably mounted in radially opposed openings and a centrifugally actuated weight member on a driving member and associated with each locking member to force the locking member into locking engagement with either driven member or the power take-off member.

SUMMARY OF THE INVENTION

It is an object of the present invention to provide a shift inhibitor arrangement for a motor vehicle manual transmission double acting synchronizing clutch disposed between a low speed gear and a higher speed gear, wherein the clutch having centrifugal force actuated locking keys biased inwardly by spring means operative, in response to a predetermined increase in output shaft rotational speed, to overcome the spring biasing means and move outwardly preventing movement of the shiftable clutch sleeve in one direction into splined engagement with the lower speed gear while permitting movement of the clutch sleeve into splined engagement with the higher speed gear.

The present invention, in its disclosed embodiment, is a bi-directional or double-acting strutless synchronizer positioned on the main or output shaft between first and second gears. A shift inhibitor is uniquely incorporated with the bi-directional synchronizer to prevent down-shifting into first gear when the output shaft is being driven above a selected rotational speed. The synchronizer hub has a pair of diametrically opposed radially extending keyways with each keyway having a shift inhibitor key slidably positioned therein. A C-shaped wire spring partially surrounds the main shaft and has a hook portion at each of its free ends retaining an associated key. The spring urges the keys inwardly to a fixed rest position contacting the main shaft such that the synchronizer sleeve may be shifted in either direction, i.e., into first or second gear. Upon the main shaft reaching a predetermined rotational speed the keys move outwardly under centrifugal force to a preset extended location. The extended keys are positioned to contact internal stop faces formed in the sleeve in the event the vehicle operator attempts to shift into first gear. The sleeve is free to be shifted into second gear during all rotational speeds of the main shaft as the extended keys contact sleeve internal cam surfaces which move the keys inwardly enabling them to be over-ridden by the sleeve.

A modification of the present invention is also disclosed wherein two pair diametrically opposed keyways are provided in the synchronizer hub with each keyway slidably receiving a key therein. A C-shaped wire spring interconnects each pair of keys as described above with each spring designed to exert a predetermined different spring constant or bias. The spring bias of the first spring is operative to permit its associated first pair of keys to move outwardly under a determined first centrifugal force to a preset extended location upon the main shaft reaching a first rotational speed. The first set of radially extended keys are positioned to contact associated first stop faces formed in the sleeve internal splines in the event the vehicle operator attempts to shift the synchronizer in a first direction while the main shaft is being driven at or above the first rotational speed.

In a like manner the second spring is operative to permit its associated second pair of keys to move outwardly under a determined second centrifugal force to a preset extended location upon the main shaft reaching a second rotational speed. The second set of extended keys are positioned to contact associated second stop faces formed in the sleeve internal splines thus preventing the vehicle operator from shifting the synchronizer in a second direction while the main shaft is being driven at or above the second rotational speed.

BRIEF DESCRIPTION OF THE DRAWINGS

Further objects, features, and advantages of the present invention will be apparent from the following description and the accompanying drawings, in which:

FIG. 6 is an exploded perspective view of the synchronizer mechanism hub and sleeve members together with the right-hand first speed gear coupling components shown in FIG. 1;

FIG. 7 is a schematic view of a shift pattern of the transmission;

FIG. 8 is a fragmentary vertical cross-sectional view similar to FIG. 1 showing a second embodiment of the invention wherein the shift inhibitor is provided with a second pair of keys to additionally prevent down-shifting from fifth speed gear to second speed gear of the transmission;

FIG. 9 is a detail cross-sectional view of the hub portion of FIG. 8 taken on the line 9—9 of FIG. 8; and FIG. 10 is a view similar to FIG. 9 taken on the line 10—10 of FIG. 8.

DETAILED DESCRIPTION OF THE INVENTION

Figure 1:
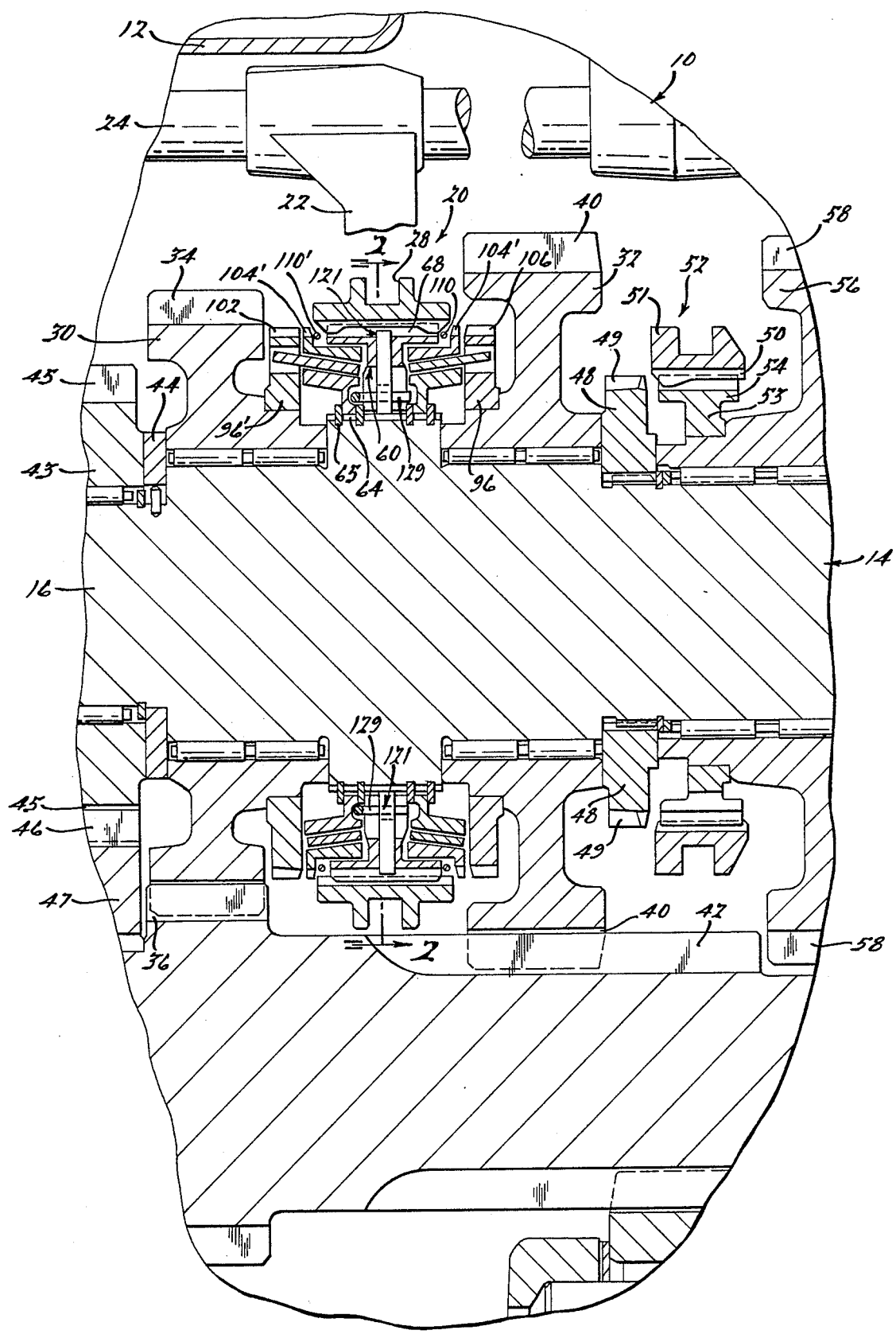
FIG. 1 is an axial longitudinal cross-sectional fragmentary view of a motor vehicle manual transmission synchronizing mechanism according to the present invention.

Referring now to the drawings and more particularly to FIG. 1 a portion of a five speed motor vehicle manual transmission is shown generally at 10. Reference may be had to U.S. Pat. No. 4,677,868 issued July 7, 1987 to T. J. Filkins, and assigned to the assignee of the present application for a detailed description of a manual transmission suitable for use with the present invention. The transmission includes a gear box housing, partially shown at 12, journally supporting an input shaft (not shown). The input shaft is connected by suitable clutch means to a vehicle engine crankshaft (not shown) journally supported in a circular housing opening as described in the above mentioned Filkins patent.

A transmission output or main shaft, shown at 14 in FIG. 1, has a foremost pilot end 16 of reduced diameter coaxially journalled within an axial blind bore of the input shaft while a forward bearing assembly supports the forward end of the main shaft 14 in the housing 12. Such conventional structure is shown and described in the above mentioned Filkins patent.

A plurality of synchromesh clutch units, such as the unit 20 shown in FIG. 1 in the form of double-acting, double-sided or bi-directional clutch unit 20, is mounted on the main shaft 14. It is to be understood that while the shift inhibitor of the present invention is shown incorporated in the bi-directional clutch unit 20 the inhibitor could be incorporated in a uni-directional clutch without departing from the scope of the present invention. Thus, for example, the inhibitor could be used in a uni-directional synchronizer clutch for a transmission reverse gear drive.

Each clutch unit 20 of the transmission is actuated by means of a shift fork, such as the shift fork for the unit 20 partially indicated at 22, supported on gear box shift selector rail 24. Thus, fork 22 is longitudinally slidable with its selector rail 24 and is connected by a yoke portion (not shown) to shift sleeve 26 of the synchronizer unit 20 by means of its circumferential groove 28. In the disclosed embodiment the synchronizer unit 20 is known as a "strutless" unit of a general type shown in U.S. Pat. No. 3,700,083 to Ashidawa et al.

The synchronizer unit 20 in FIG. 1 is depicte intermediate a transmission forwardly positioned second speed gear 30 and a rearwardly positioned first speed gear 32 both journally supported on the output main shaft 14. The second speed gear 30 has its gear teeth 34 in constant meshing engagement with teeth 36 formed on transmission countershaft 38. The countershaft 38 is disposed parallel to the main shaft 14 and is suitably journally supported in the housing 12. In a like manner the first speed gear 32 has its teeth 40 in constant meshing engagement with teeth 42 formed on the countershaft 38. It will be noted that a portion of transmission third speed gear 43 is separated from the second speed gear 30 by thrust washer 44 and third speed gear teeth 45 are in constant mesh with teeth 46 of drive gear 47 fixed, as by splines, on the countershaft 38.

Further, reverse clutch gear 48, splined on the main shaft 14, has external spline tooth surface 49 adapted to be engaged by internal splines 50 on sleeve 51 of transmission reverse clutch unit indicated generally at 52. The reverse clutch unit 52 has its hub 53 formed with external spline tooth surface 54 slidably receiving reverse sleeve internal splines 50. The hub 53 is fixed on main shaft reverse speed gear 56 shown journally supported on the main shaft 14 by needle bearings. The reverse speed gear 56 has its tooth surface 58 spaced from the countershaft 38 and in constant mesh with a conventional reverse idler gear (not shown).

Figure 3:
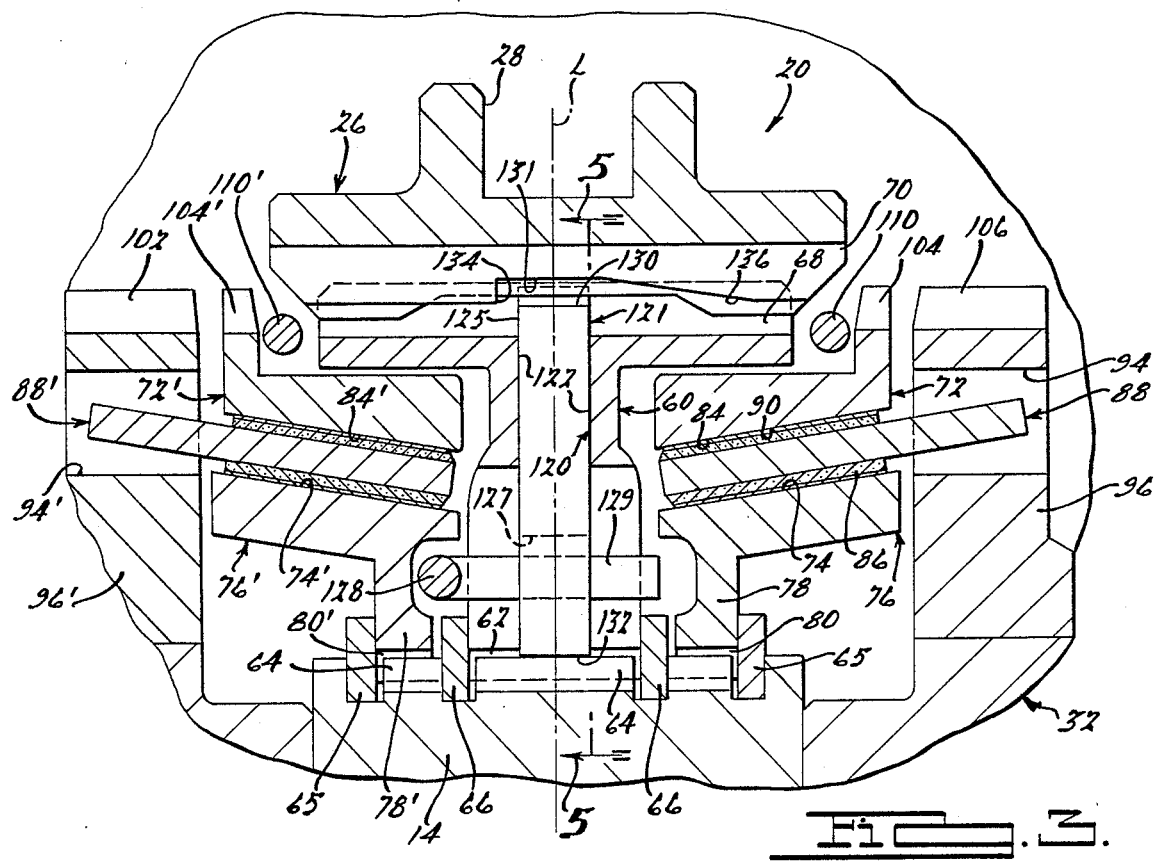
FIG. 3 an enlarged fragmentary cross-sectional view of a portion of the synchronizer mechanism of FIG. 1.

As best seen in FIG. 3 the bi-directional synchronizer unit 20 comprises a hub 60 having an inner web 61 fixed to the main shaft 14 through hub internal splines 62 engaging main shaft external splines 64. A pair of first snap rings 65 are provided to retain associated inner cone rings, to be described, while a pair of second snap rings 66 are provided to axially position the hub 60 on the main shaft 14. The shift sleeve 26 is mounted on the hub 60 by means of hub external splined tooth surface 68 slidably engaging sleeve internal splines 70. Thus, the sleeve 26 is axially movable in a fore or aft direction on the hub 60 by means of the shift fork 22. It will be noted in FIG. 6 that the hub external spline tooth surface 68 is formed with three equally spaced notches 69 for a reason to be explained below.

The disclosed bi-directional synchronizer unit 20 of the present invention is a dual cone strutless synchronizing clutch unit providing two cone surfaces and two mating friction blocking surfaces for each of its associated speed gear 30 and 32. As the bi-directional unit 20 is symmetrical about the transverse plane of construction line "L" in FIG. 3 like numbers will be used to describe right and left hand mirror image parts, with the left hand parts being primed. Thus, the operation of only the right hand first speed clutch assembly of the unit 20 will be described in detail.

As seen in FIG. 6 the unit 20 has a pair of fore and aft or left and right mirror image blocker rings 72' and 72. The blocker ring 72 is provided with three raised lugs 73 equally spaced at 120 degree intervals therearound. Each lug 73 is adapted to nested within its associated hub notch 69 shown in FIG. 6. Reference may be had to the above mentioned Ashidawa patent for a more complete depiction of a typical strutless synchronizer. Thus, during indexing or clocking of each of the blocker rings 72 its lugs 73 have their respective side faces 71 adapted to contact an opposed edge of its associated notch 69.

FIGS. 3 and 6 show a first external cone surface 74 formed on each inner cone ring 76. As best seen in FIG. 3 the inner cone ring 76 has a cylindrical portion 78 with internal splines 80 engaged with external splines 64 on the shaft 14. A second internal cone surface 84 is provided on the blocker ring 72.

A first internal conical blocking surface 86 is located on the interior of outer cone ring 88 while a second external conical blocking surface 90 is located on the exterior of the outer cone ring 88. The first internal blocking surface 86 is adapted to contact the first external cone surface 74 while the second external blocking surface 90 is adapted to contact the second internal cone surface 84. It will be noted that in the disclosed embodiment each of the blocking surfaces 86 and 90 are in the form of a friction pad or lining bonded or cemented to its associated metal cone ring surface providing effective frictional engagement. An example of one type of friction lining that may be used with the present invention is disclosed in U.S. Pat. No. 4,267,912 issued May 29, 1981 to Bauer et al., the disclosure of which is incorporated by reference herein.

As best seen in FIG. 3, each left-half outer cone ring 88' has three axially directed torque drive tangs 92' formed integral therewith and uniformly spaced on 120 degree centers. For example, each of the left-half torque drive tangs 92' extend rearwardly and engages in an associated axially positioned window 94' formed in flange portion 96' extending radially from and fixed to second speed gear 30. Further, each of the right-half torque drive tangs 92 extend forwardly and engages in an associated axially positioned window 94 formed in flange portion 96 extending radially from and fixed to first speed gear 32. Reference may by be had to the U.S. Pat. No. 4,732,247 issued Mar. 22, 1988 to B. L. Frost for a detailed description of cone ring drive tangs of the general type used in the present invention.

It will be noted in FIG. 3 that the second speed gear 30 flange portion 96 has a splined surface 102 which is coaxial and alignable with a splined surface 104' formed on the outer circumference of synchronizer left-half blocker ring 72'. Both splined surfaces 102 and 104' are engagable by the shift sleeve internal splines 70, which splines 70 are in continual engagement with the hub external splines 68, upon the sleeve 26 being shifted leftward into its second speed gear mode. In a like manner the first speed gear 32 flanged portion 100 has a splined surface 106 coaxial and alignable with splined surface 104 of the right-half blocker ring 72. Both splined surfaces 106 and 104' are engagable by the sleeve splines 70 upon the sleeve 26 being shifted rightward into it first speed gear mode.

The synchronizer assembly 20 includes a pair of closed annular springs 110 and 110' each mounted on an associated one of the blocker rings 72 and 72'. Each of the identical springs 110 and 110' are formed with a predetermined diameter such that they slidably received on their associated three lugs 73 in a snug press-fit manner with only the right-half lugs 73 being shown in FIG. 6. The function of the springs 110 and 110' is generally set forth in U.S. Pat. No. 3,700,083 issued Oct. 24, 1972 to Askikawa et al. and entitled Synchromesh Transmission Apparatus. As shown and described in the Askikawa patent projections in the form of a pair of adjacent radial extended or "tall" spring loading teeth 112 (FIGS. 2 and 6) are formed at each end of three pair of the 120 degree spaced internal sleeve splines 70.

In operation, upon the sleeve 26 being shifted axially from its neutral position of FIG. 3 toward its right or first speed gear mode, each pair of radial "tall" teeth portions 112 at the leading end of the sleeve 26 contact spring 110. It will be noted in FIGS. 2 and 6 that the sleeve has three sets of radially extended paired tall teeth portions 112 located intermediate adjacent pairs of hub slots 69. Reference may be had to U.S. Pat. No. 4,776,228 issued Oct. 11, 1988 to S. T. Razzacki et al. for a detailed explanation of the operation of a "strutless" single cone synchronizer. The disclosure of the Razzacki patent, assigned to the assignee of the present application, is incorporated by reference herein.

At the point where the spring 110 is contacted by the tall teeth 112 portions the running clearance between all the axially moving parts has been taken up. Next, a detent load builds up as the associated annular spring 110 is compressed radially by the sleeve teeth portions 112. The radial compression of the annular spring 110 generates initial cone torque between one blocker ring interior cone surface 84 and the outer cone ring exterior blocking surface 90. This cone torques causes the outer blocker ring 72 to be clocked to its indexed position.

With the blocker ring 72 in its indexed position the sleeve 26 now moves to a chamfer-to-chamfer loading position between the opposed faces of the exterior toothed surface 106 on the first speed gear flange 100 and the sleeve interior toothed surface 70. When the first speed gear 32 speed relative to its blocker ring 72 and sleeve 26 approaches zero the cone torque falls to zero. Synchronization is now complete and the blocker ring 72 is no longer energized whereby the first ratio gear 32 rotates aside to pass the sleeve splines 70 and complete lockup of the right half of clutch unit 20.

Figure 2:
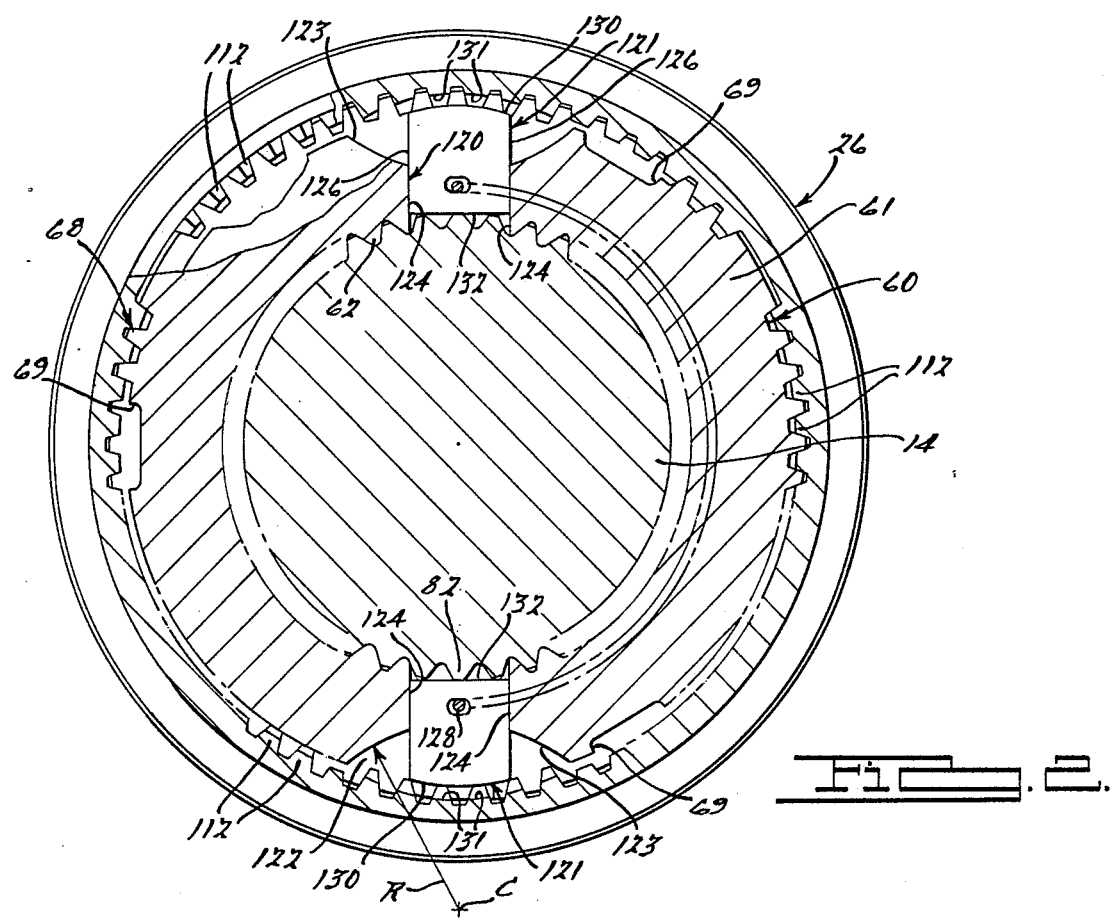
FIG. 2 is a fragmentary vertical cross-sectional view taken substantially on the line 2—2 of FIG. 1.

With reference to FIGS. 2-4 and 6 the hub 60 is formed with a pair of diametrically opposed keyways, generally indicated at 120, adapted to slidably receive associated rectangular sectioned plate blocking keys 121 therein. In the preferred embodiment each keyway 120 comprises outer and inner keyway portions. The outer keyway portion, as seen in FIG. 2, is a flute-shaped outer slot defined by parallel confronting side walls 122, oriented in transverse parallel planes, and a pair of outwardly facing arcuate surfaces 123 symmetrically machined with a common radius "R" having a center "C".

Figure 4:
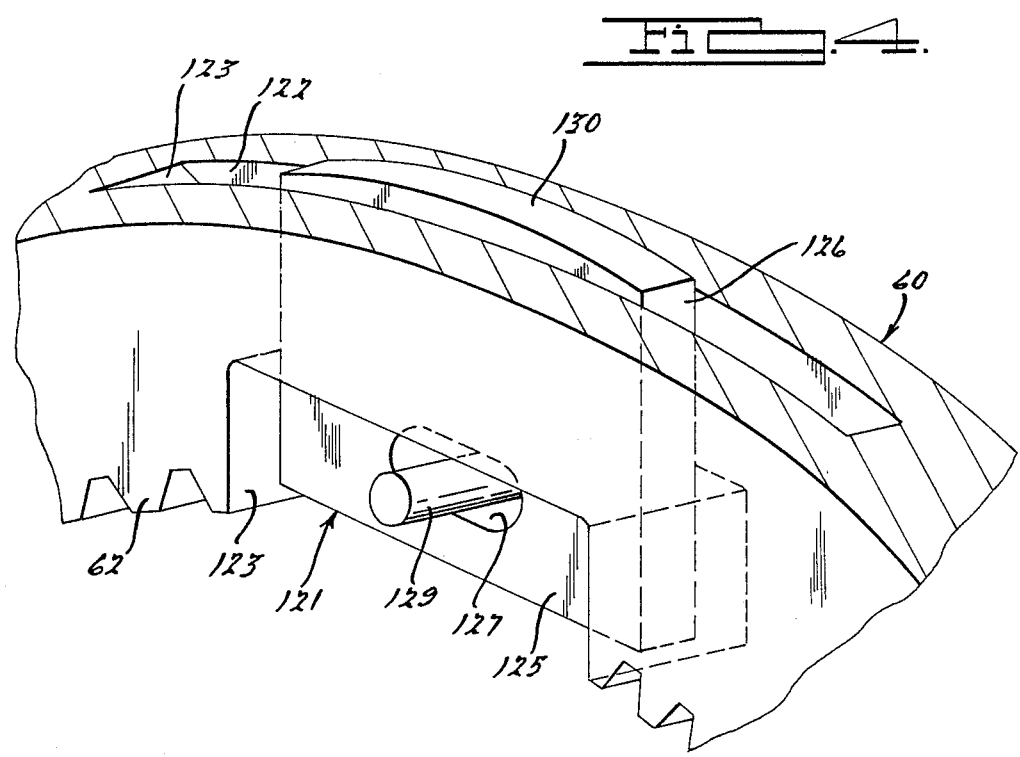
FIG. 4 is an enlarged fragmentary perspective view of the hub and key arrangement of the present invention.
Figure 5:
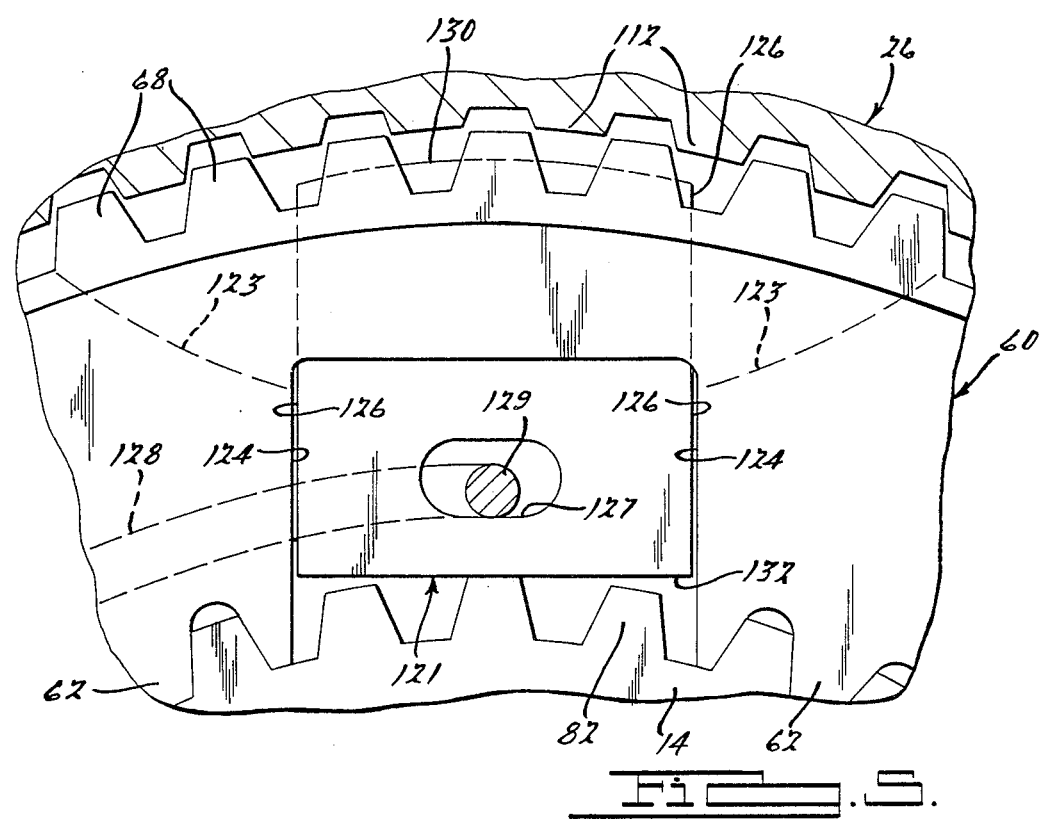
FIG. 5 is an enlarged fragmentary vertical elevational view taken substantially on line 5—5 of FIG. 3.

The inner keyway portion, as seen in FIG. 4, is defined by rectangular-shaped cutout in web 61 having parallel end support walls 124. Thus, in its radial travel each blocking key 121 has its side faces 125 guided by respective opposed outer keyway portion side support walls 122 while its end slide edges 126 are guided by opposed inner keyway porion end support walls 124.

Each blocking key 121 has an elongated slot-shaped aperture 127 therein adjacent its inner end adapted to capture one free end of a C-shaped wire biasing spring 128 therein. In the preferred form the free ends of the biasing spring 128 are bent to provide connecting means in the form of angled longitudinally extending hooks 129 each of which is lockingly received in its associated blocking key aperture 127. It will be noted in FIG. 2 that the blocking keys 121 are formed with an arcuate-shaped outer edge 130 conforming to the curvature of the outer sleeve 26.

As seen in FIG. 3 each blocking key 121 is urged inwardly to its full line position by spring 128 wherein its inner edge 131 is biased into contact with the outer splined surface of the main shaft exterior splines 82. As best seen in FIGS. 2 and 6 the C-shaped spring 128 is oriented in a transverse plane and partially surrounds the main shaft 14 in a substantially concentric manner with its hooks 129 extending parallel to the axis of the main shaft 14.

In operation, when the main shaft 14 is rotated at a predetermined rotational speed or rpm, the centrifugal force applied to the blocking keys 121 begins to overcome the inward bias of the C-shaped spring 128. It will be noted that each key has an exterior arcuate edge 130 and a tangentially oriented interior edge 132. Each of the keys 121 is thrown or moved radially outwardly under centrifugal force to its dashed line position of FIG. 3 wherein the interior edge 132 of each of the keys 121 is radially spaced so as to be out of contact with the main shaft splined surface 64.

It will be observed in FIG. 3 that at diametrically opposed locations sleeve engagement means are provided in the form of a plurality or set of sleeve interior splines 70 are notched at 131. In the disclosed embodiment of FIGS. 1-7 a pair of diametrically opposed set of four adjacent splines 70 are formed with identical notches 131 with each set providing four radially extending transverse stop faces 134. The stop faces 134 are oriented to engage their associated extended key 121 during predetermined shifting modes in a manner to be explained. It will be appreciated that each set of stop faces 134 are located a predetermined distance to the left of the bi-directional synchronizer medial plane of symmetry denoted by the dashed line "L" in FIG. 3. Each notch 131 of the two opposed sets of sleeve interior notched splines is machined with a forwardly positioned stop face 134 located a predetermined axial distance to the left of the medial plane "L". Each notch 131 is also machined with a rearwardly sloped cam surface 136 extending at a predetermined obtuse dihedral angle with the notch axial surface 131 at a determined distance to the right of the medial plane "L".

In the disclosed form of the invention the stop faces 134 are located on the left or second speed gear 30 side of the blocking keys 121 while the sloped cam surfaces 136 are located on the right or first speed gear 32 side of the blocking keys. Thus, upon the sleeve 26 being shifted leftward toward its second speed gear 30 engaged mode the cam surfaces 136 contact the exterior curved edge 130 of each blocking key 121 camming each key inwardly to its retracted position shown in full lines in FIGS. 3 and 5.

If the output shaft 14 is being rotated at a speed that is at or greater than the above mentioned predetermined speed, however, movement of the sleeve 26 rightward toward first gear 32 will be blocked by contact between the spline stop faces 132 and the opposed side face 125 of an associated blocking key 121. That is, in the disclosed bi-directional unit 20 the blocking keys 121 inhibit or prevent inadvertent down-shifting into a lesser speed gear from a higher speed gear, such as from second speed gear 30 to first speed gear 32, when the main shaft 14 is rotating at or above a predetermined rotational speed. As a result the gear shift inhibitor of the present embodiment obviates down shifting of the clutch unit 20 into first speed gear at excessive speeds thereby obviating possible damage to the input portions of the transmission.

An alternate form of the present invention is shown in the cross-sectional view of FIG. 8 incorporating a modified synchronizer unit 20'. The unit 20' is identical to the unit 20 except that it includes the addition of a second pair of diametrically opposed blocking keys 150 slidably positioned in associated second pair of diametrically opposed keyways 152. The second pair of keyways 152 are shown positioned on centerline 153 rotated through an angle "x" of about sixty degrees from the vehicle centerline (section line 9—9) of the first pair of keyways 120'. It will be appreciated however, that the centerline 153 of the second pair of keyways 152 could be disposed at different angles such as substantially ninety degrees from the centerline of the first pair of keyways 121' if desired without departing from the scope of the invention.

In the FIG. 8 modification the second pair of keys 15 are identical to the first set of keys 121 discussed in connection with FIGS. 1-7, interconnected by the first biasing spring 128. The second pair of keys 150 are shown interconnected by a second one-half circular or C-shaped biasing spring 154 formed at each free end with hooks (not shown). The second spring hooks are identical to the hooks 129 of the first spring and are received in an associated second pair blocking key aperture 156. It will be noted, however, that the first biasing spring 128 is weaker than the second biasing spring 154 by a predetermined value. As a result the second spring 154 exerts a determined stronger radially inward biasing force on the second pair of keys 150 than the determined radially inward biasing force exerted by the first spring 128 on the first pair of keys 121. It will be further noted that FIG. 8 is a view taken looking forward or leftward whereas FIG. 2 is a view taken looking rearward or rightward in FIG. 1.

Thus, during increased rotational speed of the main shaft 14 a second pair of the keys 150 move radially outwardly under the influence of centrifugal force in the same manner as the first pair of keys 121 at a lower rotational speed. Further the sleeve 26' is provided with sleeve engagement mean at diametrically opposed locations. That is certain of its internal splines are machined with forwardly facing notched stop faces together with forwardly and radially inwardly sloped cam surfaces (not shown). It will be appreciated that these faces and surfaces are in mirror image relation to the stop faces 134 and cam surfaces 136 shown in FIG. 3 for keys 121 with the exception that they are rotated therefrom a predetermined number of angular degrees, i.e., 60 degrees in the present embodiment. In this way such rotated stop faces are operative to be contacted by their associated blocking key 150 in a manner identical to the stop faces 134 and cam surfaces 136 associated with the blocking keys 121.

Thus, upon the main shaft being rotated at a second predetermined rotational speed or rpm, the centrifugal force applied to the second pair of blocking keys 150 begins to overcome the inward bias of the second biasing spring 154. As a result the second pair of the blocking keys 150 are moved radially outwardly a predetermined distance in the same manner as the first pair of blocking keys 121 preventing the vehicle operator from shifting into second speed gear 30 when downshifting from one or more higher speed gears.

Accordingly, as seen in a typical shift pattern shown in FIG. 7, the blocking keys 150 prevent the vehicle operator from inadvertently down-shifting from fifth speed gear into second speed gear instead of fourth speed gear obviating excessive speeds in and possible damage to the input portions of the transmission.

While specific embodiments of the invention have been shown and described in detail to illustrate the application of the principles of the invention, it will be understood that other embodiments and modifications are possible. Thus, the clutch could be a strut-type synchronizer, as shown in the U.S Pat. No. 4,770,280 issued Sept. 13, 1988 to B. L. Frost for example, without departing from such principles.

What is claimed is:

1. In a synchronizer clutch and gear assembly comprising; a longitudinally extending main shaft having an externally splined hub fixed thereon, a first speed gear journally mounted on said shaft adjacent one axial side of said hub, said first speed gear having an annular portion thereon formed with an externally splined surface, a sleeve having internal splines slidably coupled to said hub external splines and slidable thereon in one direction to an operative position such that upon said sleeve internal splines being moved into engagement with said first speed gear splined surface said clutch operative to couple said engaged speed gear in rotation with said shaft, a blocker ring having internal cone surface means disposed in a radially outward manner defining a clearance with associated external cone surface means adapted for positive rotational movement with said main shaft, and resilient load means for moving said blocker ring toward said first speed gear during the axial shifting operation of said clutch sleeve toward said speed gear to effect frictional engagement of said internal and external cone surface means, the improvement wherein:

said hub formed with a first pair of diametrically opposed radially extending keyways, each said keyway having one of a first pair of blocking keys slidably received therein, a first substantially half circular-shaped wire biasing spring having diametrically opposed connecting means formed at each of its free ends, said first spring concentrically disposed about said shaft, each said connecting means engaging an associated one of said first pair of keys so as to urge said first pair of keys inwardly under a predetermined spring force preventing said keys from contacting associated stop means on said sleeve thereby allowing said sleeve to be shifted axially in said one direction into synchronized engagement with said first speed gear splined surface, such that rotation of said shaft at a predetermined speed causing a centrifugal force to be exerted on said keys sufficient to overcome said first spring and cause said first pair of keys to move radially outwardly a predetermined distance wherein said keys are adapted to engage associated stop means on said sleeve, whereby said sleeve is prevented from being shifted in said one direction into engagement with said first speed gear splined surface.

2. The synchronizer clutch and gear assembly as set forth in claim 1, wherein said sleeve stop means in the form of internal splines having notched radially disposed stop shoulders adapted to engage an opposed face of its associated key.

3. The synchronizer clutch assembly as set forth in claim 1, wherein each said free end engaging means of said wire spring in the form of an angled longitudinally extending hook engaging an aperture in its associated key.

4. The synchronizer clutch assembly as set forth in claim 1, wherein a second speed gear journally mounted on said shaft adjacent the other axial side of said hub, said hub formed with a second pair of diametrically opposed radially extending keyways, each keyway of said second pair of keyways having an associated one of a second pair of blocking keys slidably disposed therein, a second substantially half-circle shaped wire biasing spring having diametrically opposed engagement means engaging an associated on said second pair of keys, said second spring urges said second pair of keys inwardly under a predetermined spring force greater than the force of said first spring preventing said second set of keys from contacting associated stop means on said sleeve thereby allowing said sleeve to be shifted axially in the opposite direction into synchronized engagement with a splined surface on said second speed gear, such that rotation of said shaft at a second predetermined increased speed causing a centrifugal force to be exerted on said second pair of keys sufficient to overcome said second spring and cause said second pair of keys to move radially outwardly a predetermined distance wherein they contact their associated stop engagement means such that said sleeve is prevented from being shifted in said opposite direction into engagement with said second speed gear splined surface.

5. In a manual transmission double-acting synchronizer clutch and speed gear assembly comprising; a main shaft with said clutch located intermediate high and low range speed gears journally mounted on said shaft, each said speed gear having an external splined tooth surface concentrically associated therewith, a clutch hub fixed on said shaft intermediate said speed gears having an external splined tooth surface, a shift sleeve having an internal splined tooth surface coupled to said hub external splined tooth surface adapted for slidable fore and aft travel on said hub for selective engaging either said fore or aft speed gear splined tooth surface, respectively, alternately coupling said speed gears for rotation with said shaft, a blocker ring concentrically surrounding said shaft intermediate each said speed gear and said clutch hub, one or more fore and aft internal and external sets of cone surfaces, a clearance between each said set of cone surfaces with an associated external cone surface for reciprocal movement relative thereto, means attaching each said external cone surface to an associated one of said speed gears, resilient thrust means for moving an associated one of said blocker rings toward its associated speed gear in shifting operation of said sleeve toward a selected speed gear to effect frictional engagement of said one blocker ring internal conical surface with its associated speed gear external internal cone surfaces providing cone torque therebetween, said hub formed with diametrically opposed keyways, each said keyway having a radially slidable locking key therein, spring means interconnecting said locking keys and operative to bias said keys inwardly to a predetermined location enabling said sleeve to be selectively shifted fore or aft into synchronized engagement with an associated speed gear, said locking keys operative during a predetermined rotational speed of said main shaft to extend outwardly under centrifugal force to a predetermined location, said extended keys adapted to contact associated stop faces or cam faces formed in said sleeve interior splines, whereby said sleeve is permitted to move in one axial direction to engage one of said speed gear spline surfaces by virtue of its cam faces causing said locking keys to be moved to their predetermined retracted locations, and whereby said sleeve is prevented from moving in the other axial direction obviating engagement with the other speed gear spline surface.

6. In a double-acting gear synchronizer clutch assembly comprising fore and aft range speed ratio gears journally mounted on a main drive shaft, each said gear having an externally splined surface fixed thereon, said clutch including an externally splined hub fixed on said shaft intermediate said gears and having fore and aft cylindrical portions, each said cylindrical portion encircling an associated fore and aft blocker ring surrounding said shaft, a clutch sleeve encircling said hub portion and having internal spline teeth in continual engagement with said hub portion external spline teeth, said sleeve being axially movable in either a fore or aft direction by a shifting arrangement such that said sleeve internal spline teeth are adapted to selectively engage with either said fore or aft gear externally splined surface, and resilient loading means for moving each said blocker ring toward its associated fore or aft gear during the axial shifting operation of said sleeve toward each said gear to effect frictional engagement of associated fore an aft internal and external cone means selectively interconnecting each said blocker ring with its associated fore or aft gear, whereby upon said sleeve moving from its neutral position either fore or aft wherein associated cone means of the fore or aft blocker ring and gear are fictionally loaded by said resilient loading means developing cone means torque therebetween, whereby the selected blocker is rotated in one direction to an indexed position, and wherein upon the index torque developed in said indexed position exceeding the cone torque developed by its associated cone means its associated blocker ring is rotated in the opposite direction allowing said sleeve internal splines to pass into lock-up engagement with its associated gear external splined surface as said sleeve completes its full axial travel, the improvement wherein:

said hub formed with diametrically opposed keyways, each said keyway having a radially slidable locking key therein, spring means interconnecting said locking keys and operative to bias said keys inwardly to a predetermined location enabling said sleeve to be selectively shift fore and aft into synchronized engagement with an associated speed gear, said locking keys operative during a predetermined rotational speed of said shaft to extend outwardly under centrifugal force to a predetermined location, said extended keys adapted to contact associated stop faces or cam surfaces formed in said sleeve interior splines, whereby said sleeve is permitted to move in one axial direction to engage one of said gear spline surfaces by virtue of said cam faces causing said keys to move inwardly to their predetermined retracted positions.

* * * * *